US012581393B2

(12) United States Patent
Choi et al.

(10) Patent No.: US 12,581,393 B2
(45) Date of Patent: Mar. 17, 2026

(54) ENABLING ON-DEMAND SYSTEM INFORMATION REQUESTS

(71) Applicant: Lenovo (Singapore) PTE. LTD., New Tech Park (SG)

(72) Inventors: Hyung-Nam Choi, Ottobrunn (DE); Joachim Loehr, Wiesbaden (DE); Prateek Basu Mallick, Dreieich (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 301 days.

(21) Appl. No.: 17/764,517

(22) PCT Filed: Aug. 12, 2020

(86) PCT No.: PCT/IB2020/057557
§ 371 (c)(1),
(2) Date: Mar. 28, 2022

(87) PCT Pub. No.: WO2021/094843
PCT Pub. Date: May 20, 2021

(65) Prior Publication Data
US 2022/0377649 A1 Nov. 24, 2022

Related U.S. Application Data

(60) Provisional application No. 62/936,095, filed on Nov. 15, 2019.

(51) Int. Cl.
*H04W 48/14* (2009.01)
*H04W 48/10* (2009.01)

(52) U.S. Cl.
CPC ........... *H04W 48/14* (2013.01); *H04W 48/10* (2013.01)

(58) Field of Classification Search
CPC .............................. H04W 48/10; H04W 48/14
See application file for complete search history.

(56) References Cited

U.S. PATENT DOCUMENTS

| | | | |
|---|---|---|---|
| 2018/0132168 A1* | 5/2018 | Ingale | H04W 72/23 |
| 2018/0199267 A1 | 7/2018 | Lin et al. | |

(Continued)

FOREIGN PATENT DOCUMENTS

| | | |
|---|---|---|
| WO | 2018/126744 A1 | 7/2018 |
| WO | 2019028211 A1 | 2/2019 |

OTHER PUBLICATIONS

PCT/EP2020/057557, "Notification Concerning Transmittal of International Preliminary Report on Patentability", Patent Cooperation Treaty, May 27, 2022, pp. 1-12.

(Continued)

*Primary Examiner* — Barry W Taylor
(74) *Attorney, Agent, or Firm* — Kunzler Needham & Hilton

(57) ABSTRACT

Apparatuses, methods, and systems are disclosed for enabling on-demand system information requests. One method (600) includes receiving (602) configuration information corresponding to an on-demand system information request procedure, wherein: the configuration information corresponds to a radio resource control connected state; the configuration information comprises an enable indication; and the enable indication indicates whether the on-demand system information request procedure is enabled for the radio resource control connected state.

13 Claims, 6 Drawing Sheets

(56) References Cited

U.S. PATENT DOCUMENTS

| | | | | |
|---|---|---|---|---|
| 2019/0045379 | A1* | 2/2019 | Ishii | H04W 24/02 |
| 2019/0223094 | A1* | 7/2019 | Ingale | H04W 48/10 |
| 2019/0268922 | A1* | 8/2019 | He | H04W 48/12 |
| 2019/0306784 | A1* | 10/2019 | Chen | H04W 48/16 |
| 2019/0357227 | A1* | 11/2019 | Khirallah | H04W 48/12 |
| 2019/0387456 | A1* | 12/2019 | Ishii | H04W 48/16 |
| 2020/0113011 | A1* | 4/2020 | Peisa | H04W 48/12 |
| 2020/0322878 | A1* | 10/2020 | Prabhakar | H04W 36/1443 |
| 2021/0105852 | A1* | 4/2021 | Shih | H04W 76/10 |
| 2021/0345367 | A1* | 11/2021 | Tao | H04W 72/0446 |
| 2022/0240163 | A1* | 7/2022 | Choi | H04W 76/28 |
| 2022/0279425 | A1* | 9/2022 | Shreevastav | G01S 19/04 |
| 2023/0217386 | A1* | 7/2023 | Orsino | H04W 48/12 370/503 |
| 2024/0155467 | A1* | 5/2024 | Shreevastav | H04W 48/12 |

OTHER PUBLICATIONS

Samsung, "On Demand SI: Remaining Issues", 3GPP TSG-RAN WG2 NR#2 R2-1706527, Jun. 27-29, 2017, pp. 1-8.
3GPP, "3rd Generation Partnership Project; Technical Specification Group Radio Access Network NR Radio Resource Control (RRC) protocol specification (Release 15)", 3GPP TS 38.331 V15.0.0, Dec. 2017, pp. 1-188.
Spreadtrum Communications, "Additional indicator for on demand SI scheduling", 3GPP TSG RAN WG2#NR_AdHoc#2 R2-1706447, Jun. 27-29, 2017, pp. 1-5.
Nokia, Nokia Shanghai Bell, "On-demand SI Delivery for RRC_IDLE/RRC_INACTIVE UEs", 3GPP TSG-RAN WG2 Meeting #101 R2-1803648, Feb. 26-Mar. 2, 2018, pp. 1-3.
Ericsson, "Dedicated RRC signaling for request and delivery of on-demand SI in NR-U", 3GPP TSG-RAN WG2 #105 R2-1901748, Feb. 25-Mar. 1, 2019, pp. 1-2.

* cited by examiner

100

104

104

102

104

102

102

200

300

500

600

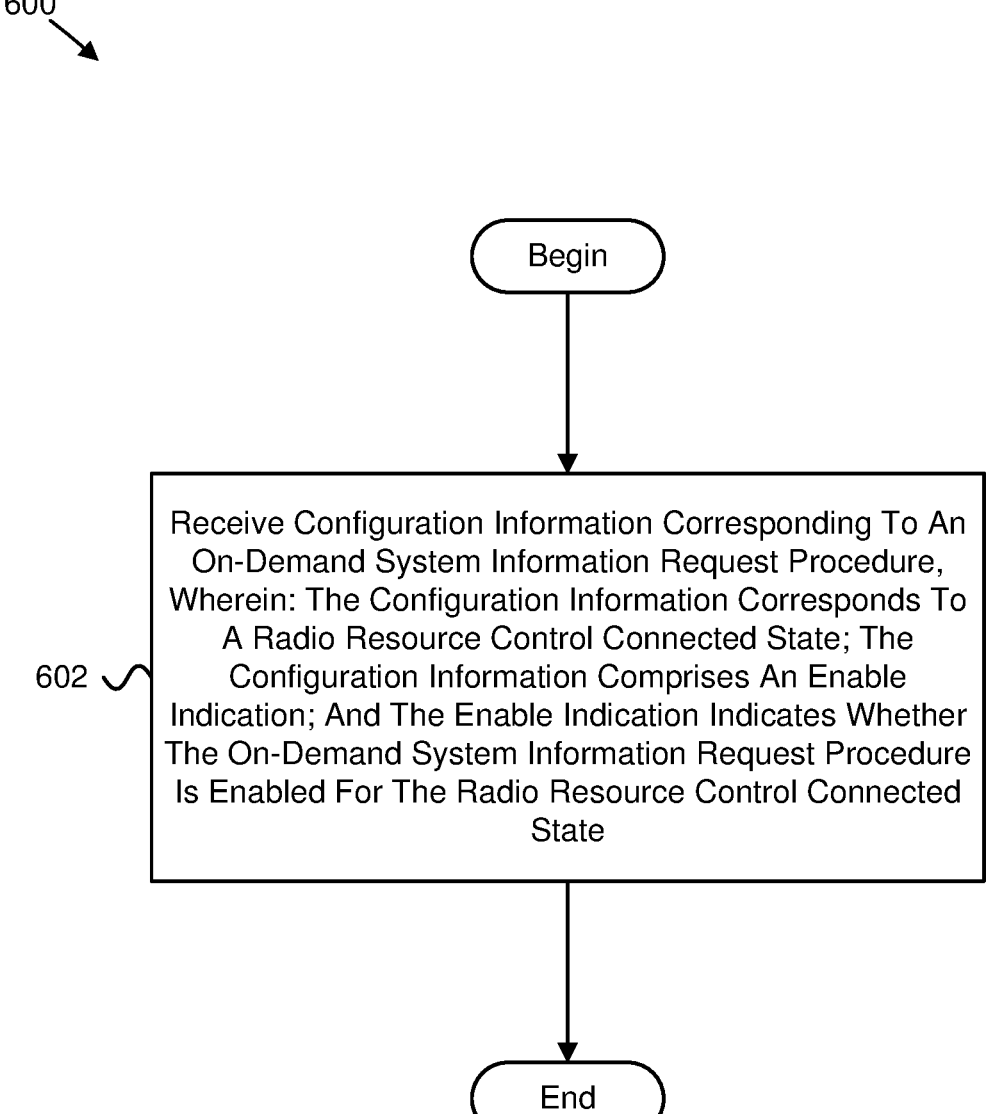

Begin

602

Receive Configuration Information Corresponding To An On-Demand System Information Request Procedure, Wherein: The Configuration Information Corresponds To A Radio Resource Control Connected State; The Configuration Information Comprises An Enable Indication; And The Enable Indication Indicates Whether The On-Demand System Information Request Procedure Is Enabled For The Radio Resource Control Connected State End

FIG. 6

ENABLING ON-DEMAND SYSTEM INFORMATION REQUESTS

CROSS-REFERENCE TO RELATED APPLICATIONS

This application claims priority to U.S. Patent Application Ser. No. 62/936,095 entitled "APPARATUSES, METHODS, AND SYSTEMS FOR NR RRC CONFIGURATION FOR ON-DEMAND SI REQUESTS IN AN RRC_CONNECTED STATE" and filed on Nov. 15, 2019 for Hyung-Nam Choi, which is incorporated herein by reference in its entirety.

FIELD

The subject matter disclosed herein relates generally to wireless communications and more particularly relates to enabling on-demand system information requests.

BACKGROUND

The following abbreviations are herewith defined, at least some of which are referred to within the following description: Third Generation Partnership Project ("3GPP"), $5^{th}$ Generation ("5G"), QoS for NR V2X Communication ("5QI/PQI"), Authentication, Authorization, and Accounting ("AAA"), Positive-Acknowledgment ("ACK"), Application Function ("AF"), Authentication and Key Agreement ("AKA"), Aggregation Level ("AL"), Access and Mobility Management Function ("AMF"), Angle of Arrival ("AoA"), Angle of Departure ("AoD"), Access Point ("AP"), Application Server ("AS"), Application Service Provider ("ASP"), Autonomous Uplink ("AUL"), Authentication Server Function ("AUSF"), Authentication Token ("AUTN"), Background Data ("BD"), Background Data Transfer ("BDT"), Beam Failure Detection ("BFD"), Beam Failure Recovery ("BFR"), Binary Phase Shift Keying ("BPSK"), Base Station ("BS"), Buffer Status Report ("BSR"), Bandwidth ("BW"), Bandwidth Part ("BWP"), Cell RNTI ("C-RNTI"), Carrier Aggregation ("CA"), Channel Access Priority Class ("CAPC"), Contention-Based Random Access ("CBRA"), Clear Channel Assessment ("CCA"), Common Control Channel ("CCCH"), Control Channel Element ("CCE"), Cyclic Delay Diversity ("CDD"), Code Division Multiple Access ("CDMA"), Control Element ("CE"), Contention-Free Random Access ("CFRA"), Configured Grant ("CG"), Closed-Loop ("CL"), Coordinated Multipoint ("CoMP"), Channel Occupancy Time ("COT"), Cyclic Prefix ("CP"), Cyclical Redundancy Check ("CRC"), Channel State Information ("CSI"), Channel State Information-Reference Signal ("CSI-RS"), Common Search Space ("CSS"), Control Resource Set ("CORESET"), Discrete Fourier Transform Spread ("DFTS"), Downlink Control Information ("DCI"), Downlink Feedback Information ("DFI"), Downlink ("DL"), Demodulation Reference Signal ("DMRS"), Data Network Name ("DNN"), Data Radio Bearer ("DRB"), Discontinuous Reception ("DRX"), Dedicated Short-Range Communications ("DSRC"), Downlink Pilot Time Slot ("DwPTS"), Enhanced Clear Channel Assessment ("eCCA"), Enhanced Mobile Broadband ("eMBB"), Evolved Node B ("eNB"), Extensible Authentication Protocol ("EAP"), Effective Isotropic Radiated Power ("EIRP"), European Telecommunications Standards Institute ("ETSI"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), Frequency Range 1-sub 6 GHz frequency bands and/or 410 MHz to 7125 MHz ("FR1"), Frequency Range 2-24.25 GHz to 52.6 GHz ("FR2"), Universal Geographical Area Description ("GAD"), Guaranteed Bit Rate ("GBR"), Group Leader ("GL"), 5G Node B or Next Generation Node B ("gNB"), Global Navigation Satellite System ("GNSS"), General Packet Radio Services ("GPRS"), Guard Period ("GP"), Global Positioning System ("GPS"), General Public Subscription Identifier ("GPSI"), Global System for Mobile Communications ("GSM"), Globally Unique Temporary Identifier ("GUTI"), Home AMF ("hAMF"), Hybrid Automatic Repeat Request ("HARQ"), Home Location Register ("HLR"), Handover ("HO"), Home PLMN ("HPLMN"), Home Subscriber Server ("HSS"), Hash Expected Response ("HXRES"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), Key Management Function ("KMF"), Layer 1 ("L1"), Layer 2 ("L2"), Layer 3 ("L3"), Licensed Assisted Access ("LAA"), Local Area Data Network ("LADN"), Local Area Network ("LAN"), Load Based Equipment ("LBE"), Listen-Before-Talk ("LBT"), Logical Channel ("LCH"), Logical Channel Group ("LCG"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Maximum Bit Rate ("MBR"), Minimum Communication Range ("MCR"), Modulation Coding Scheme ("MCS"), Master Information Block ("MIB"), Multimedia Internet Keying ("MIKEY"), Multiple Input Multiple Output ("MIMO"), Mobility Management ("MM"), Mobility Management Entity ("MME"), Mobile Network Operator ("MNO"), Mobile Originated ("MO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), New Data Indicator ("NDI"), Network Entity ("NE"), Network Exposure Function ("NEF"), Network Function ("NF"), Next Generation ("NG"), NG 5G S-TMSI ("NG-5G-S-TMSI"), Non-Orthogonal Multiple Access ("NOMA"), New Radio ("NR"), NR Unlicensed ("NR-U"), Network Repository Function ("NRF"), Network Scheduled Mode ("NS Mode") (e.g., network scheduled mode of V2X communication resource allocation—Mode-1 in NR V2X and Mode-3 in LTE V2X), Network Slice Instance ("NSI"), Network Slice Selection Assistance Information ("NSSAI"), Network Slice Selection Function ("NSSF"), Network Slice Selection Policy ("NSSP"), Operation, Administration, and Maintenance System or Operation and Maintenance Center ("OAM"), Orthogonal Frequency Division Multiplexing ("OFDM"), Open-Loop ("OL"), Other System Information ("OSI"), Power Angular Spectrum ("PAS"), Physical Broadcast Channel ("PBCH"), Power Control ("PC"), UE to UE interface ("PC5"), Policy and Charging Control ("PCC"), Primary Cell ("PCell"), Policy Control Function ("PCF"), Physical Cell Identity ("PCI"), Physical Downlink Control Channel ("PDCCH"), Packet Data Convergence Protocol ("PDCP"), Packet Data Network Gateway ("PGW"), Physical Downlink Shared Channel ("PDSCH"), Pattern Division Multiple Access ("PDMA"), Packet Data Unit ("PDU"), Physical Hybrid ARQ Indicator Channel ("PITCH"), Power Headroom ("PH"), Power Headroom Report ("PHR"), Physical Layer ("PHY"), Public Land Mobile Network ("PLMN"), PC5 QoS Class Identifier ("PQI"), Physical Random Access Channel ("PRACH"), Physical Resource Block ("PRB"), Proximity Services ("ProSe"), Positioning Reference Signal ("PRS"), Physical Sidelink Control Channel ("PSCCH"), Primary Secondary Cell ("PSCell"), Physical Sidelink Feedback Control Channel ("PSFCH"), Physical Uplink Control Channel ("PUCCH"), Physical Uplink Shared Channel ("PUSCH"), QoS Class Identifier ("QCI"), Quasi Co-Located ("QCL"), Quality of Service ("QoS"), Quadrature Phase Shift Keying ("QPSK"), Registration Area ("RA"), Random Access RNTI ("RA-RNTI"), Radio Access Network ("RAN"), Random ("RAND"), Radio Access Technology ("RAT"), Serving RAT ("RAT-1") (serving with respect to Uu), Other RAT ("RAT-2") (non-serving with respect to Uu), Random Access Channel ("RACH"), Random Access Preamble Identifier ("RAPID"), Random Access Response ("RAR"), Resource Block Assignment ("RBA"), Resource Element Group ("REG"), Radio Link Control ("RLC"), RLC Acknowledged Mode ("RLC-AM"), RLC Unacknowledged Mode/Transparent Mode ("RLC-UM/TM"), Radio Link Failure ("RLF"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Received Signal Strength Indicator ("RSSI"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Secondary Cell Group ("SCG"), Shared Channel ("SCH"), Sidelink Control Information ("SCI"), Sub-carrier Spacing ("SCS"), Service Data Unit ("SDU"), Security Anchor Function ("SEAF"), Sidelink Feedback Content Information ("SFCI"), Serving Gateway ("SGW"), System Information ("SI"), System Information Block ("SIB"), SystemInformationBlockType1 ("SIB1"), SystemInformationBlockType2 ("SIB2"), Subscriber Identity/Identification Module ("SIM"), Signal-to-Interference-Noise Ratio ("SINR"), Sidelink ("SL"), Service Level Agreement ("SLA"), Sidelink Synchronization Signals ("SLSS"), Session Management ("SM"), Session Management Function ("SMF"), Special Cell ("SpCell"), Single Network Slice Selection Assistance Information ("S-NSSAI"), Scheduling Request ("SR"), Signaling Radio Bearer ("SRB"), Shortened TMSI ("S-TMSI"), Shortened TTI ("sTTI"), Synchronization Signal ("SS"), Sidelink CSI RS ("S-CSI RS"), Sidelink PRS ("S-PRS"), Sidelink SSB ("S-SSB"), Synchronization Signal Block ("SSB"), Subscription Concealed Identifier ("SUCI"), Scheduling User Equipment ("SUE"), Supplementary Uplink ("SUL"), Subscriber Permanent Identifier ("SUPI"), Tracking Area ("TA"), TA Identifier ("TAI"), TA Update ("TAU"), Timing Alignment Timer ("TAT"), Transport Block ("TB"), Transport Block Size ("TBS"), Time-Division Duplex ("TDD"), Time Division Multiplex ("TDM"), Time Division Orthogonal Cover Code ("TD-OCC"), Temporary Mobile Subscriber Identity ("TMSI"), Time of Flight ("ToF"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE") (e.g., a V2X UE), UE Autonomous Mode (UE autonomous selection of V2X communication resource— e.g., Mode-2 in NR V2X and Mode-4 in LTE V2X. UE autonomous selection may or may not be based on a resource sensing operation), Uplink ("UL"), UL SCH ("UL-SCH"), Universal Mobile Telecommunications System ("UMTS"), User Plane ("UP"), UP Function ("UPF"), Uplink Pilot Time Slot ("UpPTS"), Ultra-reliability and Low-latency Communications ("URLLC"), UE Route Selection Policy ("URSP"), Vehicle-to-Vehicle ("V2V"), Vehicle-to-Everything ("V2X"), V2X UE (e.g., a UE capable of vehicular communication using 3GPP protocols), Visiting AMF ("vAMF"), V2X Encryption Key ("VEK"), V2X Group Key ("VGK"), V2X MIKEY Key ("VMK"), Visiting NSSF ("vNSSF"), Visiting PLMN ("VPLMN"), V2X Traffic Key ("VTK"), Wide Area Network ("WAN"), and Worldwide Interoperability for Microwave Access ("WiMAX").

In certain wireless communications networks, system information is used by mobile devices.

BRIEF SUMMARY

Methods for enabling on-demand system information requests are disclosed. Apparatuses and systems also perform the functions of the methods. One embodiment of a method includes receiving configuration information corresponding to an on-demand system information request procedure, wherein: the configuration information corresponds to a radio resource control connected state; the configuration information comprises an enable indication; and the enable indication indicates whether the on-demand system information request procedure is enabled for the radio resource control connected state.

One apparatus for enabling on-demand system information requests includes a receiver that receives configuration information corresponding to an on-demand system information request procedure, wherein: the configuration information corresponds to a radio resource control connected state; the configuration information comprises an enable indication; and the enable indication indicates whether the on-demand system information request procedure is enabled for the radio resource control connected state.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 6 is a flow chart diagram illustrating one embodiment of a method for enabling on-demand system information requests.

DETAILED DESCRIPTION

Figure 1:
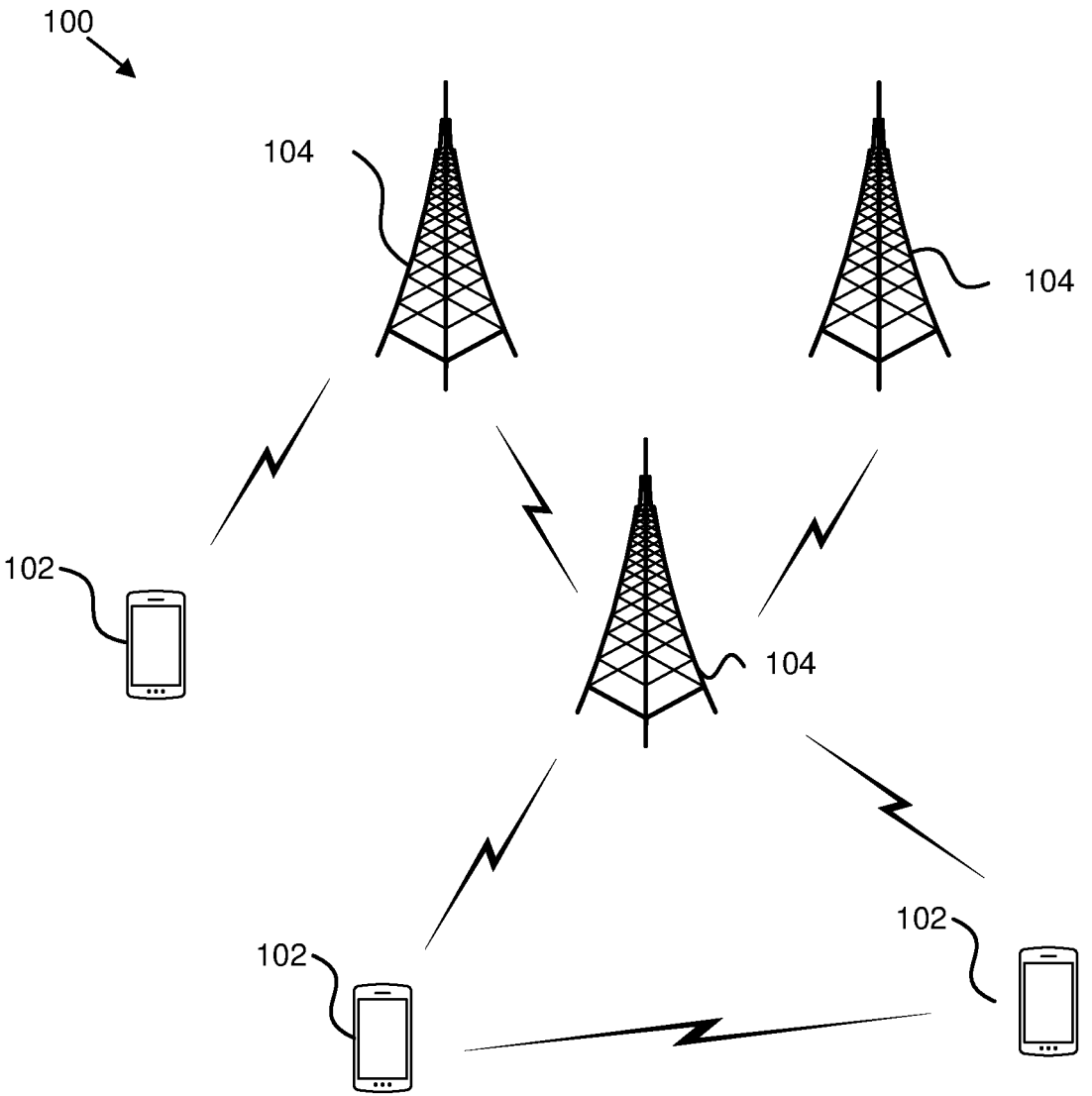
FIG. 1 is a schematic block diagram illustrating one embodiment of a wireless communication system for enabling on-demand system information requests.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of a storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for enabling on-demand system information requests. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL and/or DL communication signals. In certain embodiments, the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, an AS, an NEF, a key management server, a KMF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive configuration information corresponding to an on-demand system information request procedure, wherein: the configuration information corresponds to a radio resource control connected state; the configuration information comprises an enable indication; and the enable indication indicates whether the on-demand system information request procedure is enabled for the radio resource control connected state. Accordingly, the remote unit 102 may be used for enabling on-demand system information requests.

In some embodiments, a network unit 104 may transmit configuration information corresponding to an on-demand system information request procedure, wherein: the configuration information corresponds to a radio resource control connected state; the configuration information comprises an enable indication; and the enable indication indicates whether the on-demand system information request procedure is enabled for the radio resource control connected state. Accordingly, the network unit 104 may be used for enabling on-demand system information requests.

Figure 2:
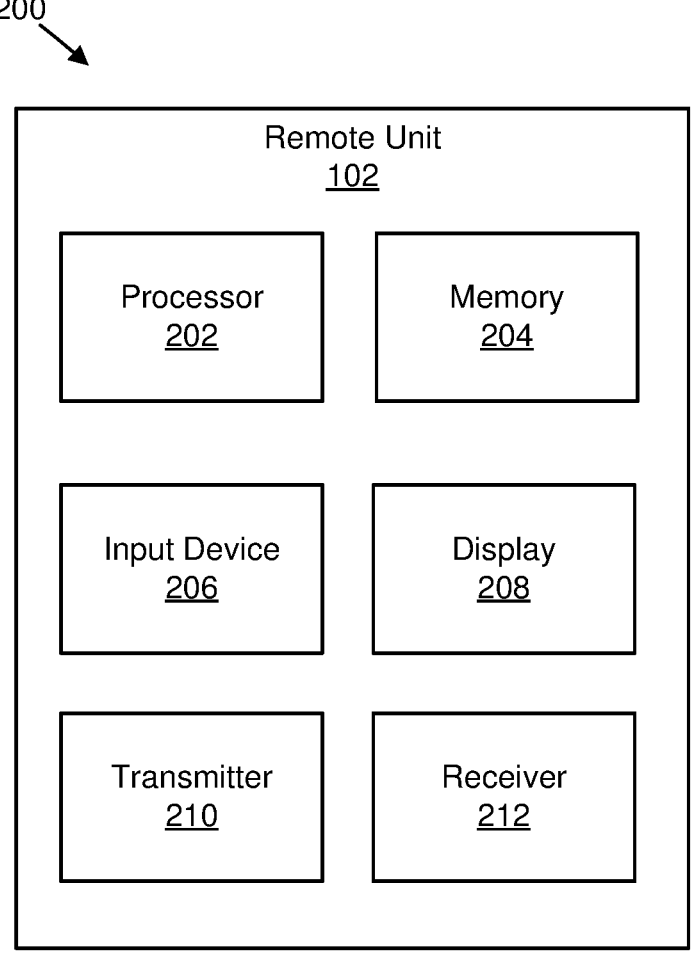
FIG. 2 is a schematic block diagram illustrating one embodiment of an apparatus that may be used for enabling on-demand system information requests.

FIG. 2 depicts one embodiment of an apparatus 200 that may be used for enabling on-demand system information requests. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The receiver 212 may receive configuration information corresponding to an on-demand system information request procedure, wherein: the configuration information corresponds to a radio resource control connected state; the configuration information comprises an enable indication; and the enable indication indicates whether the on-demand system information request procedure is enabled for the radio resource control connected state.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
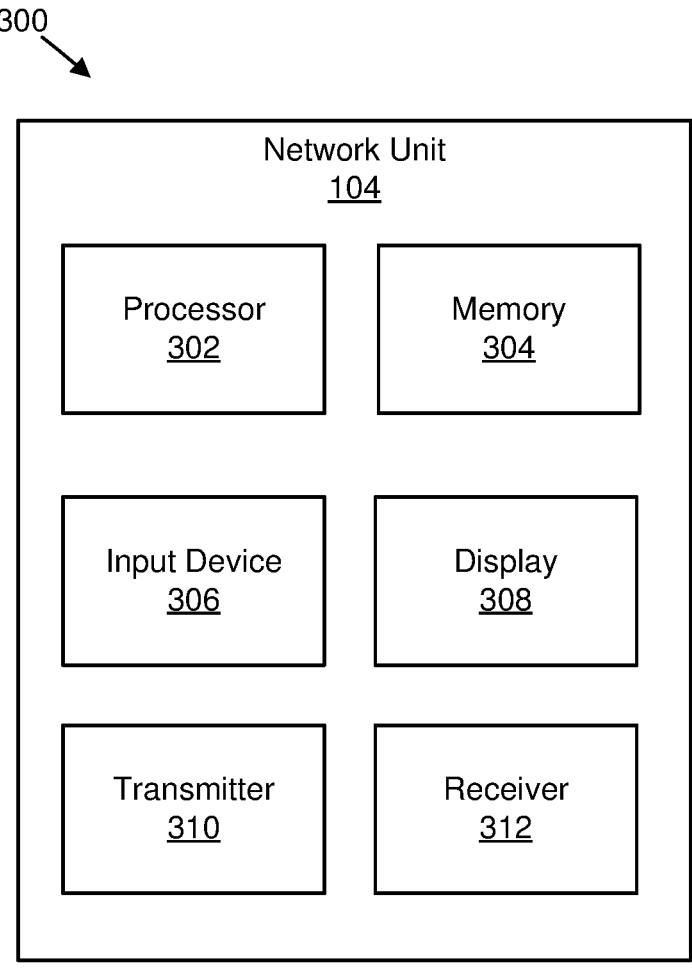
FIG. 3 is a schematic block diagram illustrating another embodiment of an apparatus that may be used for enabling on-demand system information requests.

FIG. 3 depicts one embodiment of an apparatus 300 that may be used for enabling on-demand system information requests. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310 may transmit configuration information corresponding to an on-demand system information request procedure, wherein: the configuration information corresponds to a radio resource control connected state; the configuration information comprises an enable indication; and the enable indication indicates whether the on-demand system information request procedure is enabled for the radio resource control connected state.

In certain embodiments, on-demand SI may be available. In various embodiments, SI messages may be requested by UEs through a request message (e.g., RRCSystemInfoRequest message). In such embodiments, if a parameter (e.g., "si-BroadcastStatus" in SI-SchedulingInfo in SIB1) is set to not broadcasting (e.g., "notBroadcasting") for an SI message, UEs may request the SI message. In some embodiments, a random access procedure in UL is initiated using a PRACH preamble and PRACH resource setting (e.g., in "si-RequestConfig") corresponding to an SI message that a UE requires to operate within a cell. In such embodiments, if the setting (e.g., "si-RequestConfig") is not present the UE uses Msg3 to request SI-messages (e.g., for SI-messages for which "si-BroadcastStatus" is set to "notBroadcasting"). In certain embodiments, if a UE receives acknowledgement for a request message (e.g., RRCSystemInfoRequest message), the UE acquires requested SI messages. In various embodiments, an on-demand SI request procedure may be applicable for UEs in an idle or inactive state (e.g., RRC_IDLE or RRC_INACTIVE).

Figure 4:
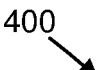
FIG. 4 is a communications diagram illustrating one embodiment of communications in an on-demand SI request procedure.
Figure 4:
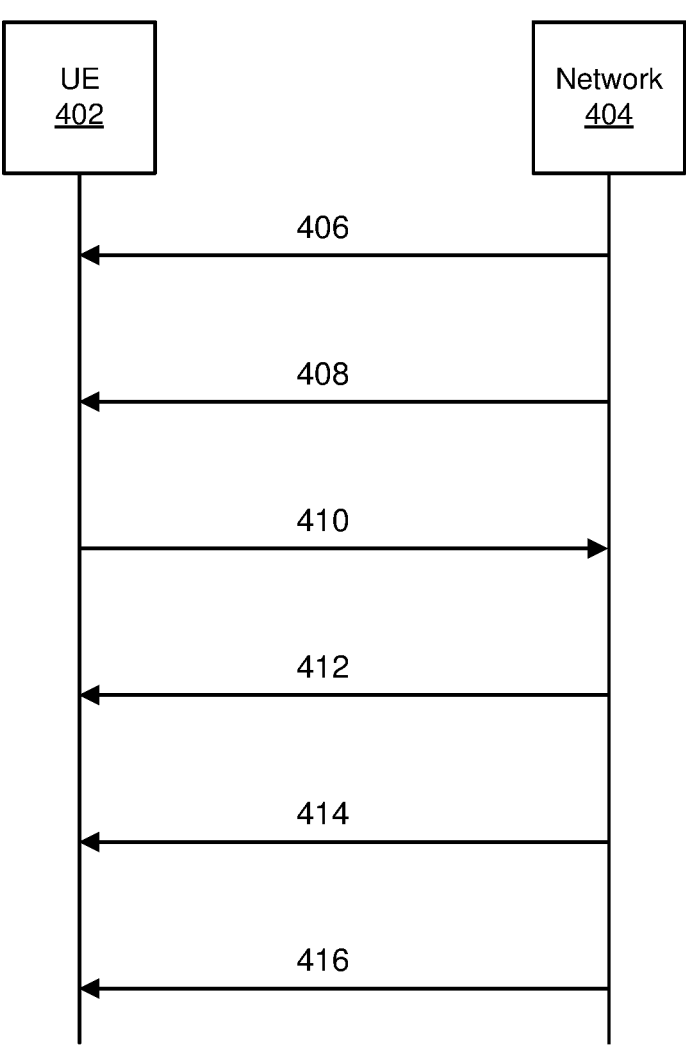

FIG. 4 is a communications diagram illustrating one embodiment of communications 400 in an on-demand SI request procedure (e.g., for UEs in an idle or inactive state). The communications 400 includes messages transmitted between a UE 402 (e.g., the remote unit 102) and a network 404 (e.g., the network unit 104). Each of the communications 400 may include one or more messages.

In a first communication 406 transmitted from the network 404 to the UE 402, the network 404 transmits an MIB to the UE 402.

In a second communication 408 transmitted from the network 404 to the UE 402, the network 404 transmits an SIB (e.g., SIB1) to the UE 402.

In a third communication 410 transmitted from the UE 402 to the network 404, the UE 402 transmits a system information request message to the network 404. The system information request message (e.g., RRCSystemInfoRequest message) may be used to request SI messages according to an order of entry in a list of SI messages configured by a scheduling information list (e.g., schedulingInfoList) in information (e.g., si-SchedulingInfo) in the SIB (e.g., SIB1). The system information request message may apply to SI that is indicated as other SI.

In a fourth communication 412 transmitted from the network 404 to the UE 402, the network 404 transmits an acknowledgment (e.g., SI request ACK) to the UE 402.

In a fifth communication 414 transmitted from the network 404 to the UE 402, the network 404 transmits a system information message (e.g., SystemInformation message) to the UE 402.

In an optional sixth communication 416 transmitted from the network 404 to the UE 402, the network 404 transmits one or more system information messages (e.g., one or more SystemInformation messages) to the UE 402.

In various embodiments, on-demand SI provisioning for UEs in a connected state (e.g., RRC_CONNECTED) may be performed (e.g., in NR, NR V2X, NR-based access to unlicensed spectrum, NR industrial IoT). Such embodiments may have one or more of the following parameters: 1) an UL-DCCH message for SI request in RRC_CONNECTED may be used, the request may be per SIB, a single message may request multiple SIBs, a UE in the connected state may not use an existing SI request procedure based on RACH, and if common search space to receive the system information is configured on an active BWP then the UE tries to receive the on-demand SI through broadcast after transmitting the SI request; 2) if common search space to receive the system information is configured on the active BWP, the UE in the connected state may check whether the required on-demand SI is being broadcasted by reading SIB1 before transmitting the SI request, and transmits the SI request only when the required on-demand SI is not being broadcasted; 3) for SIBs that need a change notification, a SI change notification may be made; 4) upon receiving the on-demand SIB request by the UE, the network responds with a configuration message (e.g., RRCReconfiguration message) that includes requested SIBs (if these are sent via dedicated signaling) but no indication about which SIBs are broadcasted; 5) the network may send requested SIBs either: all casted; all dedicated; or some broadcast and some dedicated; 6) no mechanism (e.g., prohibit timer) may be used to limit the UE from triggering on-demand SI procedures too frequently while in the connected state; and 7) the network may facilitate a size of a message containing requested SIBs not exceeding certain limitations (e.g., a PDCP SDU limitation of 9000 bytes).

Figure 5:
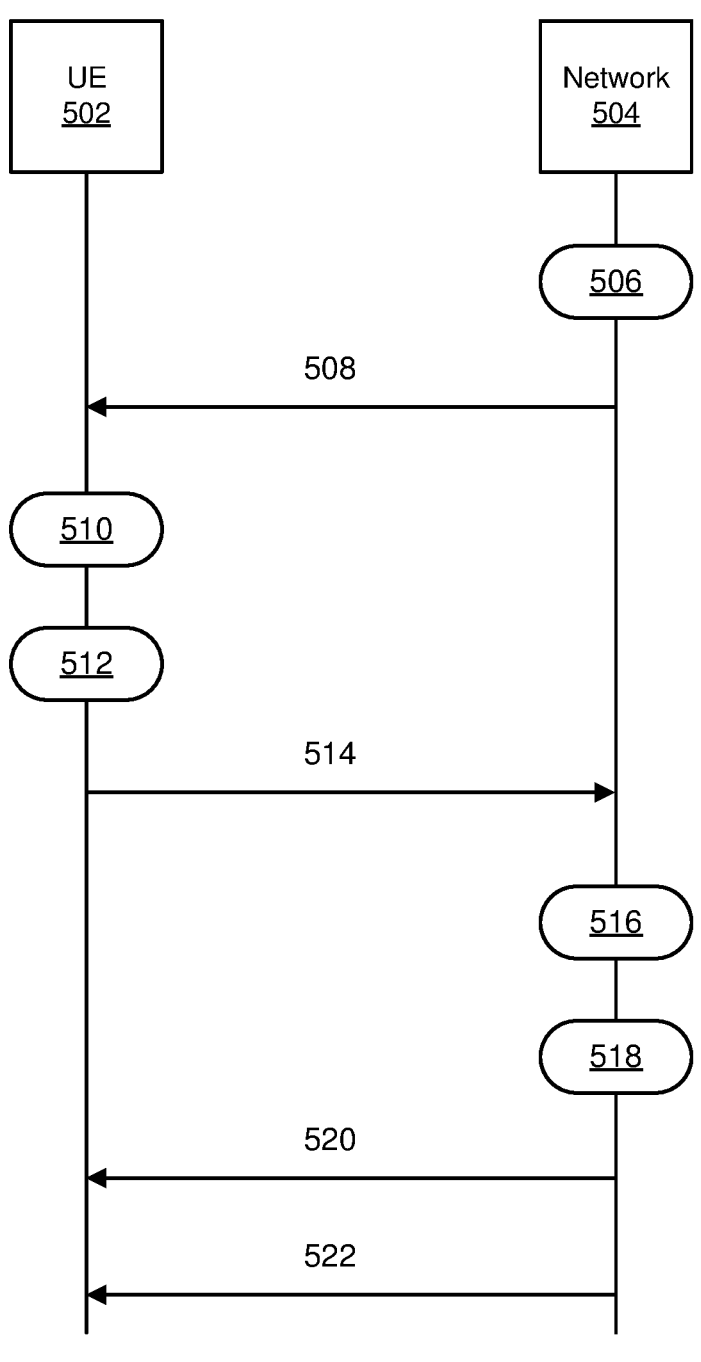
FIG. 5 is a communications diagram illustrating another embodiment of communications in an on-demand SI request procedure.

FIG. 5 shows one example of an on-demand SI request procedure in a connected state (e.g., RRC_CONNECTED). Specifically, FIG. 5 is a communications diagram illustrating another embodiment of communications 500 in an on-demand SI request procedure (e.g., for UEs in a connected state). The communications 500 includes messages transmitted between a UE 502 (e.g., the remote unit 102) and a network 504 (e.g., the network unit 104). Each of the communications 500 may include one or more messages.

The network 504 may have 506 a common search space configured on an active BWP.

In a first communication 508 transmitted from the network 504 to the UE 502, the network 504 transmits an SIB (e.g., SIB1) to the UE 502.

The UE 502 may check 510 a broadcast status of required on-demand SIBs.

The UE 502 may determine 512 that SIBs to be requested on-demand are not broadcast.

In a second communication 514 transmitted from the UE 502 to the network 504, the UE 502 transmits a dedicated SI request to the network 504.

The network 504 may process 516 the dedicated SI request and decide which of the requested SIBs to send either dedicated or broadcast to the UE 502.

The network 504 may decide 518 to send some of the requested SIBs per a third communication 520 and/or per a fourth communication 522.

In the third communication 520 transmitted from the network 504 to the UE 502, the network 504 transmits a dedicated message (e.g., RRCReconfiguration message) including one or more SIBs to the UE 502.

In the fourth communication 522 transmitted from the network 504 to the UE 502, the network 504 transmits a broadcast message (e.g., system information) including one or more SIBs to the UE 502.

In various embodiments, after sending an on-demand SI request message, it may be unknown how long a UE is to wait for an RRCReconfiguration message before monitoring broadcast system information or triggering a new on-demand SI request message. In some embodiments, a network may take some time to process all SI requests received from UEs and to decide which of the requested SIBs to send per dedicated messages or per broadcast messages.

In certain embodiments, a response (e.g., RRCReconfiguration response) timer or window may be used as a time for monitoring for a response. In such embodiments, a value range of the response timer or window may be any suitable value (e.g., 320 ms, 640 ms, 1 second, 2 seconds).

In various embodiments, a flag may be used in a message (e.g., RRCReconfiguration message) if not all or none of requested SIBs are to be sent dedicated to a UE. This flag may indicate whether an SIB content (e.g., SIB1 content) containing SI has changed (e.g., requested SIBs are broadcast) or the UE should use stored SIB (e.g., SIB1).

In some embodiments, a flag may be used to indicate whether or not a dedicated on-demand SI request procedure (e.g., for a UE in a connected state, for an RRC_CONNECTED UE) is enabled.

In certain embodiments, there may be explicit scheduling information for requested SIBs included in a message (e.g., RRCReconfiguration message).

In various embodiments, a flag in a message (e.g., RRCReconfiguration message) may be used to indicate whether requested SIBs are sent in multiple messages (e.g., RRCReconfiguration messages).

By using one or more embodiments described herein, a potential for a UE getting stuck in an on-demand SI request procedure may be reduced. This may be because the UE may know a period of time to expect a message (e.g., RRCReconfiguration message) after ending the on-demand SI request message, when and/or whether to monitor broadcast SI, and/or an earliest time to trigger a dedicated SI request message.

In some embodiments, a UE may not only be enabled to know if a network supports dedicated on-demand SI request for connected state UEs (e.g., RRC_CONNECTED UEs), but may receive one or more parameters towards fulfillment of SIB requests in an on-demand basis. Accordingly, the network may broadcast one or more of the following parameters: 1) an explicit indication enabling connected state UEs (e.g., RRC_CONNECTED UEs) to request SIBs being provided on an on-demand basis in a cell; and 2) an implicit indication enabling connected state UEs (e.g., RRC_CONNECTED UEs) to request SIBs being provided on an on-demand basis in a cell—the implicit indication may be construed as positive if one or more of the following parameters are being broadcast: a) an applicable list of SIBs or SI-messages that may be requested by connected state UEs (e.g., RRC_CONNECTED UEs)— this may or may not be a subset of the SI-messages that are being provided on an on-demand basis in the cell, as signaled in a most recent SIB1—the applicable list of SIBs or SI-messages may be indicated in a BITMAP in which each bit corresponds to one SIB or SI-message in increasing order starting with SIB2 for a first BIT or may be indicated with a flag corresponding to each SIB and/or SI-message provided by the cell and may be part of scheduling information for the corresponding SIB and/or SI-message; b) an indication to enable a UE to request dedicated transmission of a SIB that is being regularly broadcast in the cell as signaled in a most recent SIB1; c) an indication to enable a UE to request transmission of all SIBs that are provided in the cell as signaled in the most recent SIB1—the UE may be able to request all SIBs at one time in its dedicated SI request (e.g., using All_SIB Boolean set to TRUE); d) an indication to enable a UE to request transmission of all SIBs that are provided using on-demand basis in the cell as signaled in the most recent SIB1—the UE may be able to request all SIBs at one time in its dedicated SI request (e.g., using All_SIB Boolean set to TRUE); and e) a response window (e.g., RRCReconfiguration response window) configuration. If none of the above parameters (1), (2), or (a) to (e) are broadcast, the connected state UE (e.g., RRC_CONNECTED UE) may not request SIBs.

In various embodiments, upon receiving a dedicated message (e.g., a dedicated RRCReconfiguration message) in response to a dedicated on-demand SI request message for one or more SIBs, a UE may: 1) if the dedicated message does not contain some of the requested SIBs, attempt SI acquisition for the not received SIBs at a corresponding window (e.g., SI_Window) at a next occasion for the intended SI and/or SIB in the same modification period or at a next modification period, if the remaining requested SIBs were still not received in another dedicated message (e.g., dedicated RRCReconfiguration message); 2) if the response does not contain some of the requested SIBs, attempt SI acquisition for the not received SIBs at the corresponding window (e.g., SI_Window) after having acquired SIB1 again—the acquisition of SIB1 may not be postponed to the SIB1 transmission periodicity and/or modification period boundary; and 3) the prior two behaviors 1) and 2) may be controlled by a network and accordingly include an explicit indication (e.g., a Boolean flag) indicating which one of the above two behaviors is applicable.

In certain embodiments, upon not receiving a dedicated message (e.g., a dedicated RRCReconfiguration message) in response to a dedicated on-demand SI request message for one or more SIBs, a UE may reinitiate the dedicated on-demand SI request procedure starting with SIB1 acquisition at a start of a next modification period. In such embodiments, the UE may determine whether the dedicated message (e.g., dedicated RRCReconfiguration message) is received during a response window (e.g., RRCReconfiguration response window). As may be appreciated, a benefit of the window may be that a network may not need to send an empty message (e.g., RRCReconfiguration message) indicating that all requested SIBs are broadcast.

In various embodiments, a message (e.g., RRCReconfiguration message) contains recent up-to-date SIB1 scheduling info. Accordingly, a UE may not need to read a broadcast SIB1 first, but may immediately acquire SIBs.

In some embodiments, multiple messages (e.g., RRCReconfiguration messages) may be sent to a UE. For instance, in a first message (e.g., first RRCReconfiguration message) a first batch of requested SIBs may be signaled, in a subsequent message (e.g., subsequent RRCReconfiguration message) the remaining requested SIBs may be signaled. In this example, the first message may contain explicit signaling indicating whether a further message that contains requested SIBs will follow.

In various embodiments, new parameters may be defined in a message (e.g., RRCReconfiguration message). As may be appreciated, embodiments described herein may facilitate inhibiting a UE from getting stuck in an on-demand SI request procedure. For example, a UE may know a period of time to expect a message (e.g., RRCReconfiguration message) after ending an on-demand SI request message, when and/or whether to monitor broadcasted SI, and/or an earliest time to trigger a dedicated SI request message.

FIG. 6 is a flow chart diagram illustrating one embodiment of a method 600 for enabling on-demand system information requests. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

In various embodiments, the method 600 includes receiving 602 configuration information corresponding to an on-demand system information request procedure, wherein: the configuration information corresponds to a radio resource control connected state; the configuration information comprises an enable indication; and the enable indication indicates whether the on-demand system information request procedure is enabled for the radio resource control connected state.

In certain embodiments, the method 600 further comprises, in response to the enable indication indicating that the on-demand system information request procedure is enabled, transmitting a request for on-demand system information. In some embodiments, the method 600 further comprises monitoring for a response to the request for on-demand system information for a time period. In various embodiments, the time period is determined by a timer or a time window.

In one embodiment, the response comprises a transmission flag that indicates whether all or part of the system information blocks requested in the request for on-demand system information are to be transmitted in a broadcast manner. In certain embodiments, the response comprises a change flag that indicates whether system information scheduling information has changed. In some embodiments, the response comprises a content flag that indicates whether stored system information scheduling information is to be used.

In various embodiments, the response comprises scheduling information for system information blocks requested in the request for on-demand system information. In one embodiment, the response comprises a status flag indicating whether system information blocks requested in the request for on-demand system information are transmitted in a plurality of messages.

In certain embodiments, the method 600 further comprises retransmitting the request for on-demand system information as a result of not receiving the response during the time period. In one embodiment, the method 600 further comprises retransmitting the request for on-demand system information as a result of not receiving at least one requested system information block in the response or in a broadcast manner. In some embodiments, the configuration message indicates which system information blocks are able to be requested with the on-demand system information request procedure.

In one embodiment, a method comprises: receiving configuration information corresponding to an on-demand system information request procedure, wherein: the configuration information corresponds to a radio resource control connected state; the configuration information comprises an enable indication; and the enable indication indicates whether the on-demand system information request procedure is enabled for the radio resource control connected state.

In certain embodiments, the method further comprises, in response to the enable indication indicating that the on-demand system information request procedure is enabled, transmitting a request for on-demand system information.

In some embodiments, the method further comprises monitoring for a response to the request for on-demand system information for a time period.

In various embodiments, the time period is determined by a timer or a time window.

In one embodiment, the response comprises a transmission flag that indicates whether all or part of the system information blocks requested in the request for on-demand system information are to be transmitted in a broadcast manner.

In certain embodiments, the response comprises a change flag that indicates whether system information scheduling information has changed.

In some embodiments, the response comprises a content flag that indicates whether stored system information scheduling information is to be used.

In various embodiments, the response comprises scheduling information for system information blocks requested in the request for on-demand system information.

In one embodiment, the response comprises a status flag indicating whether system information blocks requested in the request for on-demand system information are transmitted in a plurality of messages.

In certain embodiments, the method further comprises retransmitting the request for on-demand system information as a result of not receiving the response during the time period.

In one embodiment, the method further comprises retransmitting the request for on-demand system information as a result of not receiving at least one requested system information block in the response or in a broadcast manner.

In some embodiments, the configuration message indicates which system to information blocks are able to be requested with the on-demand system information request procedure.

In one embodiment, an apparatus comprises: a receiver that receives configuration information corresponding to an on-demand system information request procedure, wherein: the configuration information corresponds to a radio resource control connected state; the configuration information comprises an enable indication; and the enable indication indicates whether the on-demand system information request procedure is enabled for the radio resource control connected state.

In certain embodiments, further comprising a transmitter, the transmitter, in response to the enable indication indicating that the on-demand system information request procedure is enabled, transmits a request for on-demand system information.

In some embodiments, the receiver monitors for a response to the request for on-demand system information for a time period.

In various embodiments, the time period is determined by a timer or a time window.

In one embodiment, the response comprises a transmission flag that indicates whether all or part of the system information blocks requested in the request for on-demand system information are to be transmitted in a broadcast manner.

In certain embodiments, the response comprises a change flag that indicates whether system information scheduling information has changed.

In some embodiments, the response comprises a content flag that indicates whether stored system information scheduling information is to be used.

In various embodiments, the response comprises scheduling information for system information blocks requested in the request for on-demand system information.

In one embodiment, the response comprises a status flag indicating whether system information blocks requested in the request for on-demand system information are transmitted in a plurality of messages.

In certain embodiments, the transmitter retransmits the request for on-demand system information as a result of not receiving the response during the time period.

In one embodiment, the transmitter retransmits the request for on-demand system information as a result of not receiving at least one requested system information block in the response or in a broadcast manner.

In some embodiments, the configuration message indicates which system information blocks are able to be requested with the on-demand system information request procedure.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method at a user equipment (UE), the method comprising:

receiving, from a base station, configuration information corresponding to on-demand system information (SI), wherein the configuration information is received in a first radio resource control (RRC) configuration message during an RRC connected state, wherein the configuration information comprises a flag that explicitly indicates whether dedicated on-demand SI is enabled during the RRC connected state, wherein the on-demand SI comprises one or more system information blocks (SIBs);

transmitting, to the base station, a dedicated message requesting one or more on-demand SIBs based on the dedicated on-demand SI being enabled; and receiving, from the base station, the requested one or more on-demand SIBs in a second RRC configuration message.

2. The method of claim 1, wherein the second RRC configuration message comprises a transmission flag that indicates whether all or part of the system information blocks requested in the request message for on-demand system information blocks are to be transmitted in a broadcast manner.

3. The method of claim 1, wherein the second RRC configuration message comprises a change flag that indicates whether system information scheduling information has changed.

4. The method of claim 1, wherein the second RRC configuration message comprises scheduling information for system information blocks requested in the request message for on-demand system information blocks.

5. The method of claim 1, wherein the second RRC configuration message comprises a status flag indicating whether system information blocks requested in the request message for on-demand system information blocks are transmitted in a plurality of response messages.

6. The method of claim 1, further comprising retransmitting the request message for on-demand system information blocks as a result of not receiving at least one requested system information block in the second RRC configuration message or in a broadcast manner.

7. A user equipment (UE), comprising:

at least one memory; and at least one processor coupled with the at least one memory and configured to cause the UE to:

receive, from a base station, configuration information corresponding to on-demand system information (SI), wherein the configuration information is received in a first radio resource control (RRC) configuration message during an RRC connected state, wherein the configuration information comprises a flag that explicitly indicates whether dedicated on-demand SI is enabled during the RRC connected state, wherein the on-demand SI comprises one or more system information blocks (SIBs);

transmit, to the base station, a dedicated message requesting one or more on-demand SIBs based on the dedicated on-demand SI being enabled; and receive, from the base station, the requested one or more on-demand SIBs in a second RRC configuration message.

8. The UE of claim 7, wherein the second RRC configuration message comprises a transmission flag that indicates whether all or part of the system information blocks requested in the request message for on-demand system information blocks are to be transmitted in a broadcast manner.

9. The UE of claim 7, wherein the second RRC configuration message comprises a change flag that indicates whether system information scheduling information has changed.

10. The UE of claim 7, wherein the second RRC configuration message comprises scheduling information for system information blocks requested in the request message for on-demand system information blocks.

11. The UE of claim 7, wherein the second RRC configuration message comprises a status flag indicating whether system information blocks requested in the request message for on-demand system information blocks are transmitted in a plurality of response messages.

12. The UE of claim 7, wherein the at least one processor is configured to cause the UE to retransmit the request message for on-demand system information blocks as a result of not receiving at least one requested system information block in the second RRC configuration message or in a broadcast manner.

13. A base station, comprising:

at least one memory; and at least one processor coupled with the at least one memory and configured to cause the base station to:

transmit, to a user equipment (UE), configuration information corresponding to on-demand system information (SI), wherein the configuration information is transmitted in a first radio resource control (RRC) configuration message during an RRC connected state, wherein the configuration information comprises a flat that explicitly indicates whether dedicated on-demand SI is enabled during the RRC connected state, wherein the on-demand SI comprises one or more system information blocks (SIBs); and receive, from the UE, a dedicated message requesting one or more on-demand SIBs based on the dedicated on-demand SI being enabled; and transmit, to the UE, the requested one or more on-demand SIBs in a second RRC configuration message.

* * * * *